US008861855B2

(12) United States Patent
Pellegrini et al.

(10) Patent No.: US 8,861,855 B2
(45) Date of Patent: Oct. 14, 2014

(54) METHOD AND APPARATUS FOR SIMPLIFYING ELECTRO-OPTICAL IMAGING SYSTEMS

(71) Applicants: Paul Pellegrini, Bedford, MA (US); Steven DiSalvo, Chelmsford, MA (US); Luigi Spagnuolo, Andover, MA (US); Mark Gill, Everett, MA (US); Michael J Noyola, Centerville, OH (US)

(72) Inventors: Paul Pellegrini, Bedford, MA (US); Steven DiSalvo, Chelmsford, MA (US); Luigi Spagnuolo, Andover, MA (US); Mark Gill, Everett, MA (US); Michael J Noyola, Centerville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 114 days.

(21) Appl. No.: 13/743,377

(22) Filed: Jan. 17, 2013

(65) Prior Publication Data
US 2013/0182954 A1    Jul. 18, 2013

Related U.S. Application Data

(60) Provisional application No. 61/587,710, filed on Jan. 18, 2012.

(51) Int. Cl.
*G06K 9/00*        (2006.01)
*G06T 7/00*        (2006.01)
*G06K 9/62*        (2006.01)

(52) U.S. Cl.
CPC .............. *G06T 7/00* (2013.01); *G06K 9/0063* (2013.01); *G06K 9/6201* (2013.01); *G06K 9/6247* (2013.01)
USPC ..................................................... 382/170

(58) Field of Classification Search
None
See application file for complete search history.

(56) References Cited

U.S. PATENT DOCUMENTS

| | | | |
|---|---|---|---|
| 6,366,681 B1 | 4/2002 | Hutchins | |
| 7,593,551 B2 * | 9/2009 | Kamei | 382/118 |
| 7,911,517 B1 | 3/2011 | Hunt, Jr. et al. | |
| 7,940,387 B2 * | 5/2011 | Dluhy et al. | 356/301 |
| 8,244,498 B2 * | 8/2012 | Wold et al. | 702/179 |
| 2004/0197013 A1 * | 10/2004 | Kamei | 382/118 |
| 2007/0269096 A1 * | 11/2007 | Timmis et al. | 382/133 |
| 2009/0035766 A1 * | 2/2009 | Khan et al. | 435/6 |
| 2009/0086201 A1 * | 4/2009 | Dluhy et al. | 356/301 |
| 2012/0134582 A1 * | 5/2012 | Treado et al. | 382/165 |

OTHER PUBLICATIONS

Principal Component Analysis, I. T. Jolliffe, Springer Series in Statistics, Second Edition, Springer, New York (2002).
Dimensionality Reduction: A Comparative Review, L.J.P. van der Maaten, E.O. Postma, H.J. van der Herik, Maastricht University, P. O. Box 616, 6200 MD Maastricht, The Netherlands (2009).
Matlab Toolbox for Dimensionality Reduction, L.J.P. van der Maaten, Maastricht University, P. O. Box 616, 6200 MD Maastricht, The Netherlands (2009).
Dimensionality Reduction for Hyperspectral Data, D. P. Widemann, PhD dissertation, University of Maryland (2008).

* cited by examiner

*Primary Examiner* — Bhavesh Mehta
*Assistant Examiner* — Feng Niu
(74) *Attorney, Agent, or Firm* — AFMCLO/JAZ; Charles Figer Jr

(57) ABSTRACT

A method, apparatus and program product are provided for simplifying electro-optical imaging data. Spectral/temporal data is received. The spectral/temporal data is formulated into a vector/matrix. Feature extraction analysis is performed. At least two largest principal components are determined from the feature extraction analysis. A cluster diagram is created from the at least two largest principal components. A distance metric is evaluated from the cluster diagram. And, a largest metric is selected based on the distance metric.

20 Claims, 8 Drawing Sheets

METHOD AND APPARATUS FOR SIMPLIFYING ELECTRO-OPTICAL IMAGING SYSTEMS

CROSS-REFERENCE TO RELATED APPLICATIONS

This application claims the benefit of and priority to U.S. Provisional Application Ser. No. 61/587,710, entitled "Method and Apparatus for Simplifying Electro-optical Imaging Systems," filed on Jan. 18, 2012, the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention generally relates to electro-optical systems and, more particularly, analyzing and reducing data generated by said systems.

2. Description of the Related Art

The most basic of electro-optical sensors are those that measure intensity. They are often known in the visible imaging community as black and white sensors. It is known that adding color information to that type of sensor creates more information. In terms of human viewing of the measured scene, a color image is more pleasing to the eye than the intensity based black and white image. Color sensing devices for both still cameras and television cameras generally measure 3 colors: red, green, and blue. In these imagers, only the three independent colors are recorded and the color information displayed is some combination of the three colors. However, for many applications, it is necessary to record many more independent colors. Color information also exists in optical bands from ultraviolet (0.3 µm) through infrared (20 µm). Outside of this region there is additional information, but the atmosphere usually absorbs the energy making it challenging to record any useful information. An additional complication arises with the measurement of photon energy at wavelengths beyond 1.7 µm. Contemporary sensing materials that can be used for these wavelengths require some form of external cooling. The addition of a cooling requirement adds considerable expense, complexity and reduction of reliability to any imaging system. Contemporary earth-based and satellite-based imaging systems generally use many more than three spectral bands for imaging tasks. The spectral sensing community defines systems which measure more than 100 colors as hyperspectral.

The complexity of the data measured by a high fidelity hyperspectral imaging system is shown in FIG. 1. This image was generated by NASA/JPL and illustrates the result of the measured data as a hyperspectral image cube 10. The data was taken from an aircraft flying at 20,000 feet. The top 12 of the cube 10 is a black and white representation of a false color image that is human friendly and shows the various recorded land features. The vertical axis 14 of this image cube is the color dimension, which contains 224 independent colors from the visible spectral band (0.4 µm) to the Short Wave Infrared (2.4 µm). X and Y dimensional data are along axes 16 and 18 respectively. The added variable of time evolution increases the dimensionality of the data needed to analyze to four (x-position, y-position, spectrum, time), thus increasing the complexity.

However, the complexity may be decreased by noting that each pixel in the data cube 10 of FIG. 1 has 244 spectral components. Hypercubes such as that shown in FIG. 1 may be important for understanding plant and crop physiology. By limiting analysis to single pixels, the data complexity may be reduced to three (one pixel, color and time). If the analysis is further limited to cases where there is only a single constituent in each pixel, it is not necessary to confront the problem of mixed pixels where there are a mixture of items in each pixel. A typical spectrum 20 from a single pixel is shown in FIG. 2. A different phenomenon is shown in FIG. 3. The data is from a land based spectral instrument and consists of 180 individual wavelengths covering the visible (0.5 µm) through the (5.5 µm) in the Mid Wave Infrared (MWIR) spectral region recorded at a single instant of time. In order to assess the time dimension or the time evolution of spectrum, refer to graph 22 in FIG. 3. The graph 22 shows the image of a star looking through the atmosphere where there is significant turbulence. The three curves are taken at three successive instants of time spaced two milliseconds apart. There are about 100 separate independent spectral measurements displayed on this graph. The transient spectral character is displayed by the intensity at each two ms time sample. In the visible/near infrared portion of the spectrum (0.7 µm to 0.9 µm) the signal goes from being in the noise (15 data counts) at t=0 to 85 data counts four milliseconds later.

Accordingly, even with the reduced complexity, there is a need in the art for a method and apparatus for more efficiently examining complex spectral data sets.

SUMMARY OF THE INVENTION

Embodiments of the invention address the need in the art by providing a method, apparatus, and program product for simplifying electro-optical imaging data. In these embodiments, spectral/temporal data is received. The spectral/temporal data is formulated into a vector/matrix. A feature extraction analysis is performed. At least two largest principal components are determined from the feature extraction analysis. A cluster diagram is created from the at least two largest principal components. A distance metric is evaluated from the cluster diagram. And, a largest metric is selected based on the distance metric.

In some embodiments, the formulating, performing, determining, creating, and evaluating steps is repeated for additional spectral/temporal data. In some of these embodiments, the spectral/temporal data include a plurality of wavelengths, and the formulating spectral/temporal data into a vector/matrix includes selecting a first subset of the wavelengths in the plurality of wavelengths and formulating the selected first subset of wavelengths into a vector/matrix. In these embodiments, repeating the formulating, performing, determining, creating, and evaluating steps may also include selecting a second subset of the wavelengths in the plurality of wavelengths, and repeating the formulating, performing, determining, creating, and evaluating steps for the selected second subset of wavelengths. In a specific embodiment, the first and second subsets of wavelengths each include 2 wavelengths.

In some embodiments, the feature extraction analysis may be selected from a group including: independent component analysis, nonlinear prime component analysis, support vector decomposition analysis, principal component analysis, and combinations thereof. In these and other embodiments, the distance metric may be a statistical metric. In some of these embodiments, the statistical metric may be a standard deviation.

Additional objects, advantages, and novel features of the invention will be set forth in part in the description which follows, and in part will become apparent to those skilled in the art upon examination of the following or may be leaned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 9 is an exemplary implementation of the results of the algorithm in FIG. 7 plotted on the scatter plot in FIG. 8;

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Embodiments of the invention address the need in the art by providing a technique for assisting in reducing the complexity of high dimensional data sets. The data examined in the illustrative embodiments of the invention is electro-optical, hyperspectral having a large number of independent dimensions in the spectral parameter, though other types of data such as Radar or optical data, for example, are also contemplated. A significant addition to the large number of independent dimensions is that the data also include a time varying component where hyperspectral samples are measured at specific times. This combination of independent time samples of hyperspectral data rapidly increases the data dimensionality. Even though the data may have many independent dimensions, some of them may be redundant for a particular task or objective. While the illustrative embodiments of the invention apply to time varying optical signals, the underlying procedure used in these embodiments may be applied to any time varying data where each time sample of the data has high dimension. The underlying procedure, set forth in more detail below, takes complex, high dimensional data sets and assists in reducing them to manageable sizes by eliminating data redundancy. In one particular illustrative embodiment, a method of examining hyperspectral data having more than 100 independent wavelength measurements which are collected over a specific, independent series of sampling times is described.

Figure 3:
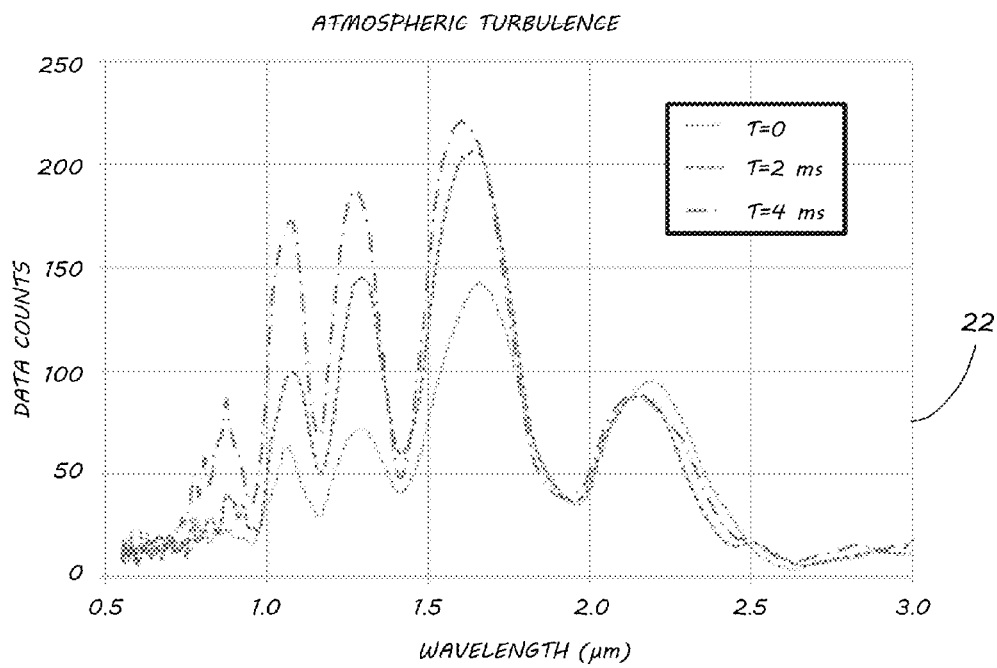
FIG. 3 is an exemplary graph illustrating a time evolution of a spectrum of a single pixel.

Some of the embodiments described will focus on the following types of spectral data, though other embodiments may use other types of spectral or radar data. For the illustrated embodiments, the spectral data is of a single location or resides in a single pixel located on a sensing device or Focal Plane Array (FPA). The spectral data has a temporal variation in that there are several samples of the same event taken at different times. For satellite-based land imaging, for example, this may occur when a satellite is located in a position to record the data. It may be hourly, daily, or weekly and need not be at fixed intervals. The data used to describe some of the embodiments of the invention simulates a satellite passing daily over a specific site of interest. Over a month, a sensor on the satellite may record 30 hypercubes of data, for example. In the star turbulence example of FIG. 3 above, time measurements were in two millisecond increments and the spectrum was the result of removing the time measurements from the spatial/spectral/temporal data cube.

Figure 1:
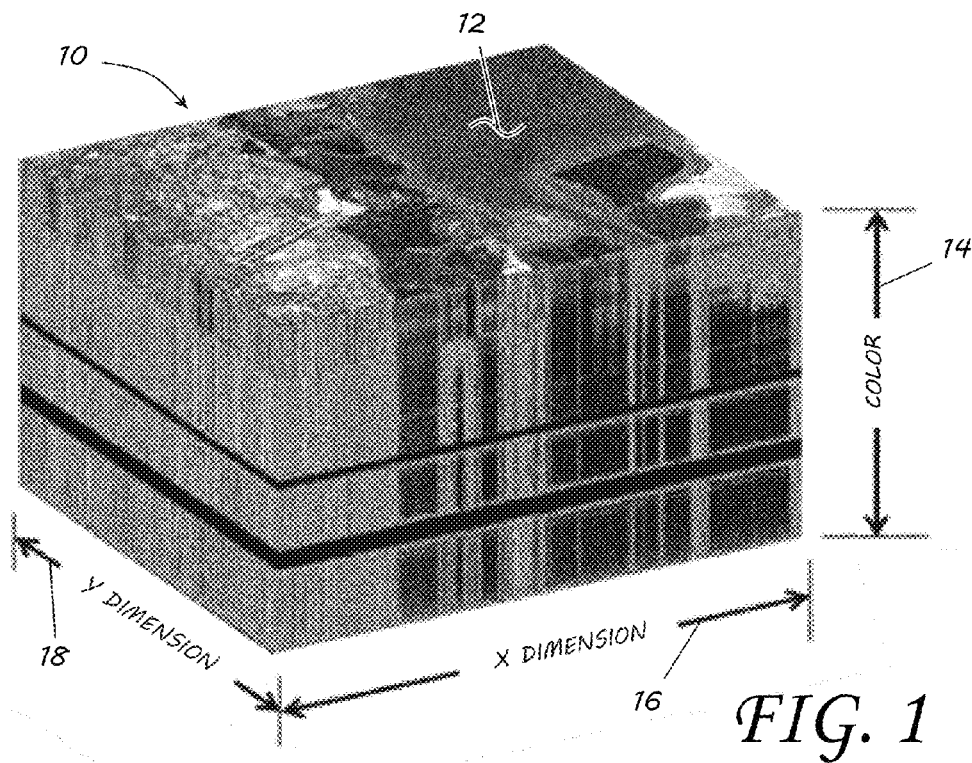
FIG. 1 is an exemplary hyperspectral image cube at a single time.
Figure 2:
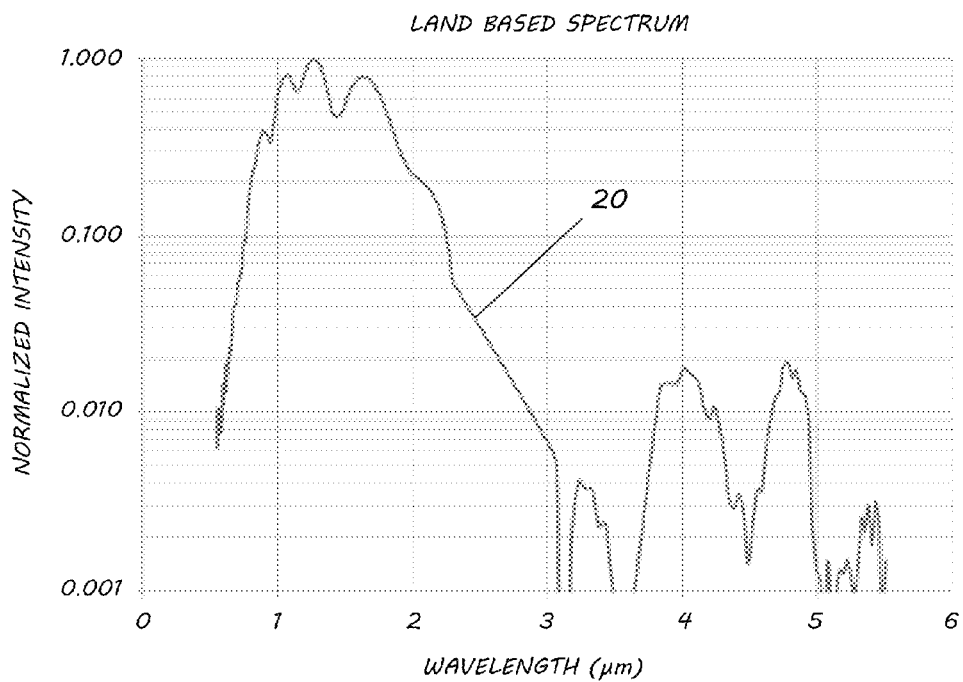
FIG. 2 is an exemplary spectrum graph from a single pixel of the hyperspectral cube in FIG. 1.

As set out above, the data to be evaluated has at least three dimensions; however, the reality of the data collection process is that each spectrum created is an independent variable. This means the number of independent variables increases rapidly for spectral data. With data of large dimensionality, it is difficult, if not impossible to find a representation in two dimensions that can be used by a human observer for quickly understanding the underlying phenomena contained therein. In addition, the measured data can have a random or statistical nature making it even more difficult for human understanding. The hypercube in FIG. 1 is one contemporary method of visualizing the data, but as established above, the cube is not well suited for three dimensional data with an additional temporal variable. A better method, as used in embodiments of the invention, is to reduce the dimensionality of the data in order to achieve better visualization.

One method to increase the understanding of this class of data, used in some embodiments of the invention, is to use cluster analysis. Cluster analysis is a mathematical method of describing the similarities between different types of data. Clusters of data may be formed if the underlying physical parameters of the measured data are known. Though, the underlying parameters for the data needed to be analyzed are not always known, and hence additional methodology needs to be used to determine such parameters. Many methods may be employed such as independent component analysis, non-linear prime component analysis, support vector decomposition analysis, among others. One particular method is linear Principal Component Analysis (PCA), which is used to determine the underlying phenomena in the data in some embodiments of the invention. PCA is a statistical tool that makes no assumptions about the underlying phenomenology. The physical relationships between the variables are unknown, but it is possible to determine the statistical measures of variance and covariance for the measured data. PCA uses these statistical constructs to examine the amount of information in a data set. It then determines a set of axes on which to plot the original data where the largest amount of underlying information is contained. PCA uses the variance in the data as its definition of information and maximizes the amount of variance in each of its derived components.

For example, if the measured data has p orthogonal dimensions, then it will take all p components to completely and accurately describe the system. However, the data may have significant redundancy and the system can be adequately described by k of these components where k<<p. If there is sufficient information in these k components, the system may be described adequately but not completely. Since the p components are linearly derived, the system can be completely reconstituted using a mathematical inversion process. This is not possible with k<p.

Figure 4:
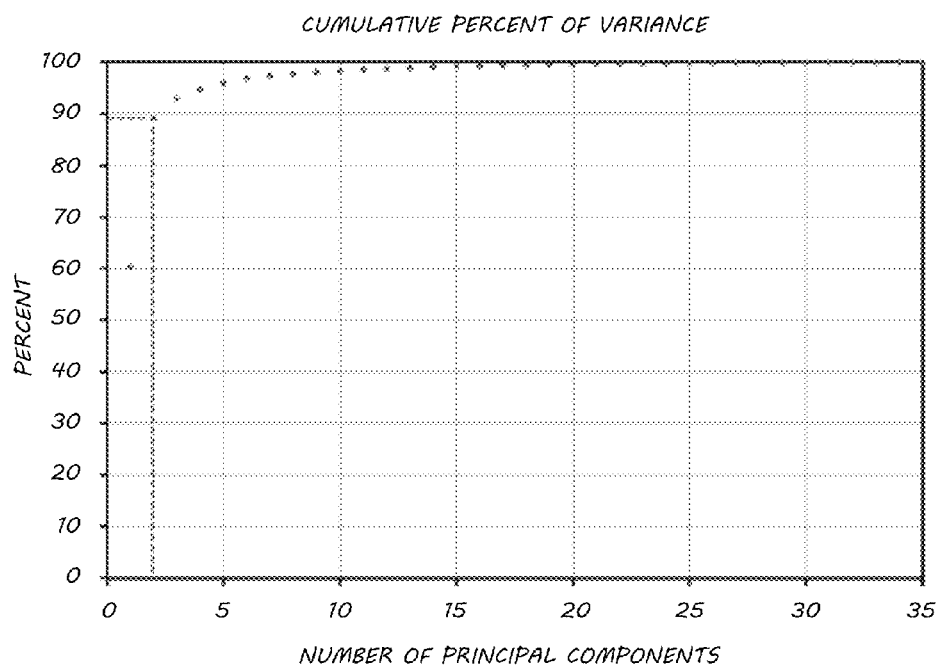
FIG. 4 is a graph of cumulative percent of variance for feature selection.

If k=2, the two orthogonal dimensions containing the largest amount of information or variance may be used to select axes and plot the original data. FIG. 4 illustrates the effectiveness of this axis selection criterion. The horizontal axis is the number of components and the vertical axis is the cumulative percent on information variance contained. This figure shows that almost 90% of the total information contained in the original data may be included by using only these two axes. From this interpretation it is likely that replacing the original components with only two may be effective. Note that using PCA does not produce the final result for simplification of the original high dimensional data, it is only one mathematical means used to assist in obtaining the final answer.

Figure 5:
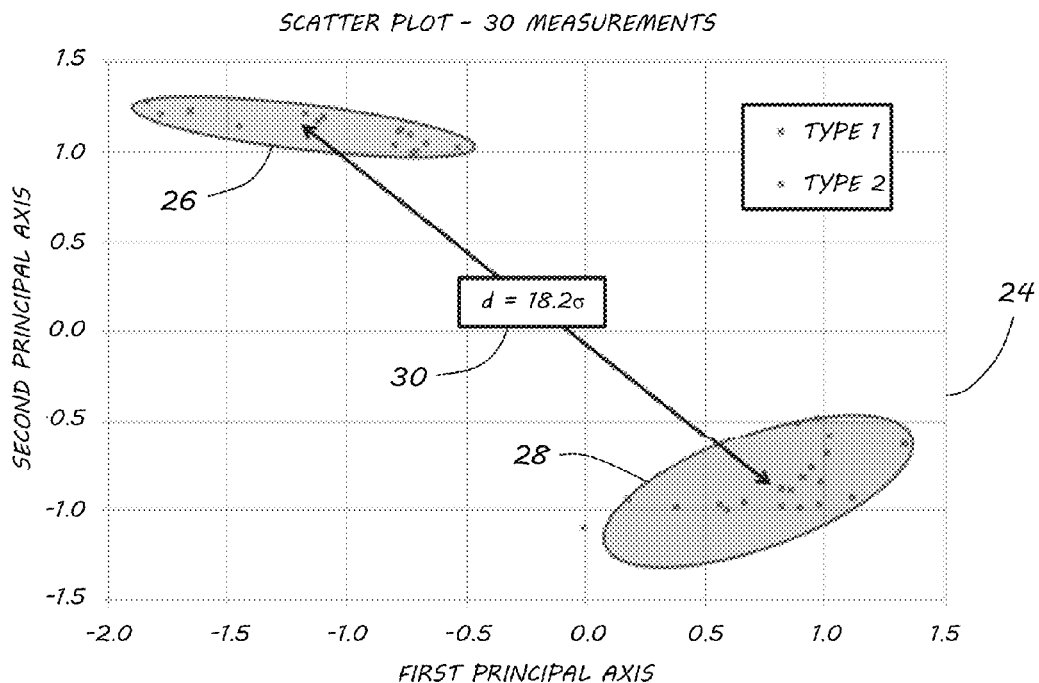
FIG. 5 is an exemplary scatter plot of the spectral/temporal data in FIG. 3 for two principle components.

FIG. 5 shows a scatter plot 24 of the individual measurements on the axes defined by the first two principal components. Since the axes are a transform of the original data, it is not possible to ascribe phenomenology to them. They are labeled the first and the second principal axes. However, there is sufficient difference in the original spectral/temporal data that the scatter plot shows well-formed clusters 26, 28. The indication is that the data came from two different sources. If these had been hyperspectral measurements of, say, crops in two different fields, then the clustering method would be useful for identification of the individual species.

An objective of using PCA is to reduce the complexity of a set of measured data having a large number of interrelated variables or mathematically, dimensions. It does this by reducing the number of dimensions in the high dimensional measured data space. It maximizes the amount of generic information from the high dimensional, measured data space which is kept in the new transformed low dimensional space. In the illustrated example, the number of dimensions is reduced to two so that the original data may be easily examined and interpreted on the Principal Component axes as shown in FIG. 5.

The data from a spatial/spectral/temporal sensor providing measurements in the illustrated example forms into separated clusters when plotted on a two dimensional space defined by the first two principal components. In order to determine the efficacy of this separation it is necessary to define the distance between the two clusters in the two dimensional space. First, it is noted that FIG. 5 is the result of mapping data from a high dimensional space (in many cases the number of dimensions is several thousand) onto two dimensions. Second, as linear PCA is being used, the assumption is made that the variables are linearly related and that the noise in the measurements is Gaussian. These assumptions are not strictly true in most cases, however examination of the clusters of FIG. 5 indicates that the assumption is realistic if not strictly correct. To encompass both of these observations, it is necessary find a distance metric that can be used to address goodness of separation. A distance 30 shown in FIG. 5 is given in standard deviations between the mean of the clusters, assuming the data in each cluster has a Gaussian distribution. As the data is originally in a high dimensional space, it is necessary to use a distance metric which can project that information into a two dimensional space. Any number of distance metrics may be used. For example, some embodiments may utilize the following distance metric:

$$d = -\tfrac{1}{2}\ln|S| - \tfrac{1}{2}(x-m)^T \cdot S^{-1} \cdot (x-m) + \ln(p)$$

where d is the scalar distance, S is the covariance matrix of the original data, |S| is the determinant of S, $S^{-1}$ is the inverse of S, x-m is the distance between the means, T is the transpose operator, and p is the number of classes (2).

The result of d is given in terms of standard deviation (SD). That is, there will be a specific number standard deviations between the two clusters. If a straight line is drawn between the mean values of the two clusters in FIG. 5, it is observed that there are two possibilities for the standard deviation distance. The difference in distance metric derives from the fact that the data in each cluster has a different value of standard deviation in the direction of the mean to the second cluster. Hence, the distance answer will be given in terms of SD from the top cluster or of SD from the bottom cluster. Since the PCA is a mapping of information from a high dimensional space onto two dimensions, the distance may also be computed as a geometric mean of the two distances, which would then define the distance as a "figure of merit" distance.

The cluster metric assists in measuring the effects of reducing the number of measurement wavelengths. For example, in the case of the NASA/JPL AVIRIS (Airborne Visible/Infrared Imaging Spectrometer) data shown in FIG. 1, there are 224 separate spectral bands recorded. In addition, an infrared portion of the spectral data requires a cryogenically cooled infrared focal plane array, which adds significant cost to the hyperspectral system. When the distance analysis was applied to the measured data for FIG. 5, a value of d=18.2σ was obtained. That is, there are about 18 units of the standard deviation metric between the two clusters using more than 100 wavelengths. This value is substantial and indicates there will be little chance of wrongly deciding that the temporally changing spectrum of items that belong in one cluster actually belong in that cluster. 30 time samples were used to simulate a month of measurements taken daily. It is expected that the distance metric will change depending on the number of observations used or how many wavelengths are selected. As embodiments of the invention attempt to decrease complexity or in this case the number of wavelengths in a specific dimension, it is expected that the distance metric will change. As embodiments of the invention are intended to be utilized for design of simplified, lower cost sensors, it is also of interest to eliminate the need for cryogenic cooling such as that needed in the AVIRIS sensor. Thus, complexity reduction may be concentrated on using wavelengths that do not have that requirement in some embodiments.

Figure 6A:
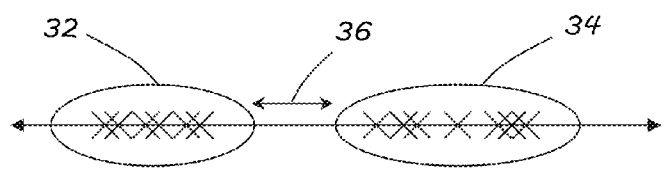
FIGS. 6A-6C are graphs illustrating the effects of lower numbers of principle components.
Figure 6B:
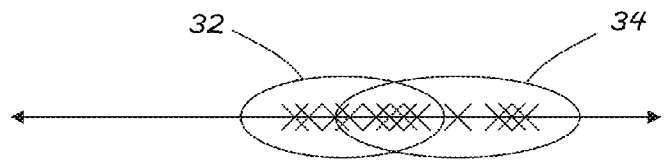
Figure 6C:
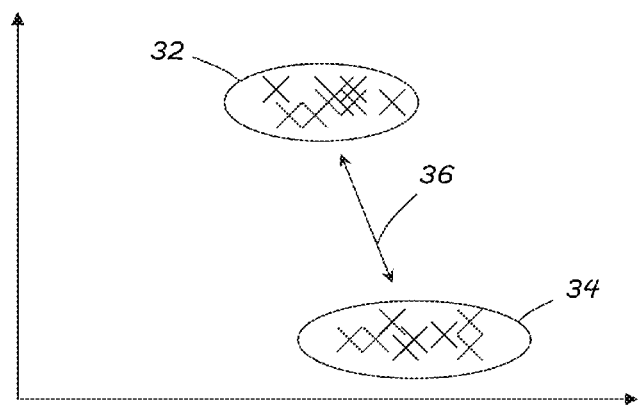

The absolute minimum number of wavelengths that could be selected is one. The data would then be mapped to a single dimension and plotted along a single principle component as illustrated in FIG. 6A. Similar to the two dimensional example above, data may cluster 32, 34 along the principle component axis separated by some statistical distance 36. However, with only one dimension, there is a much higher risk of the clustered data 32, 34 overlapping as illustrated in FIG. 6B, thus increasing the chance of wrongly deciding that the temporally changing spectrum of items that belong in one cluster actually belong in that cluster, though these clusters 32, 34 may be statistically distinct if evaluated in more than one dimension as seen in FIG. 6C. A better minimum number of wavelengths to be called a spectral system is two. More wavelengths may always be used, however, with each additional wavelength, complexity of displaying or reporting the data increases, and complexity of design of a specialized sensor to measure the reduced data also increases.

Figure 7:
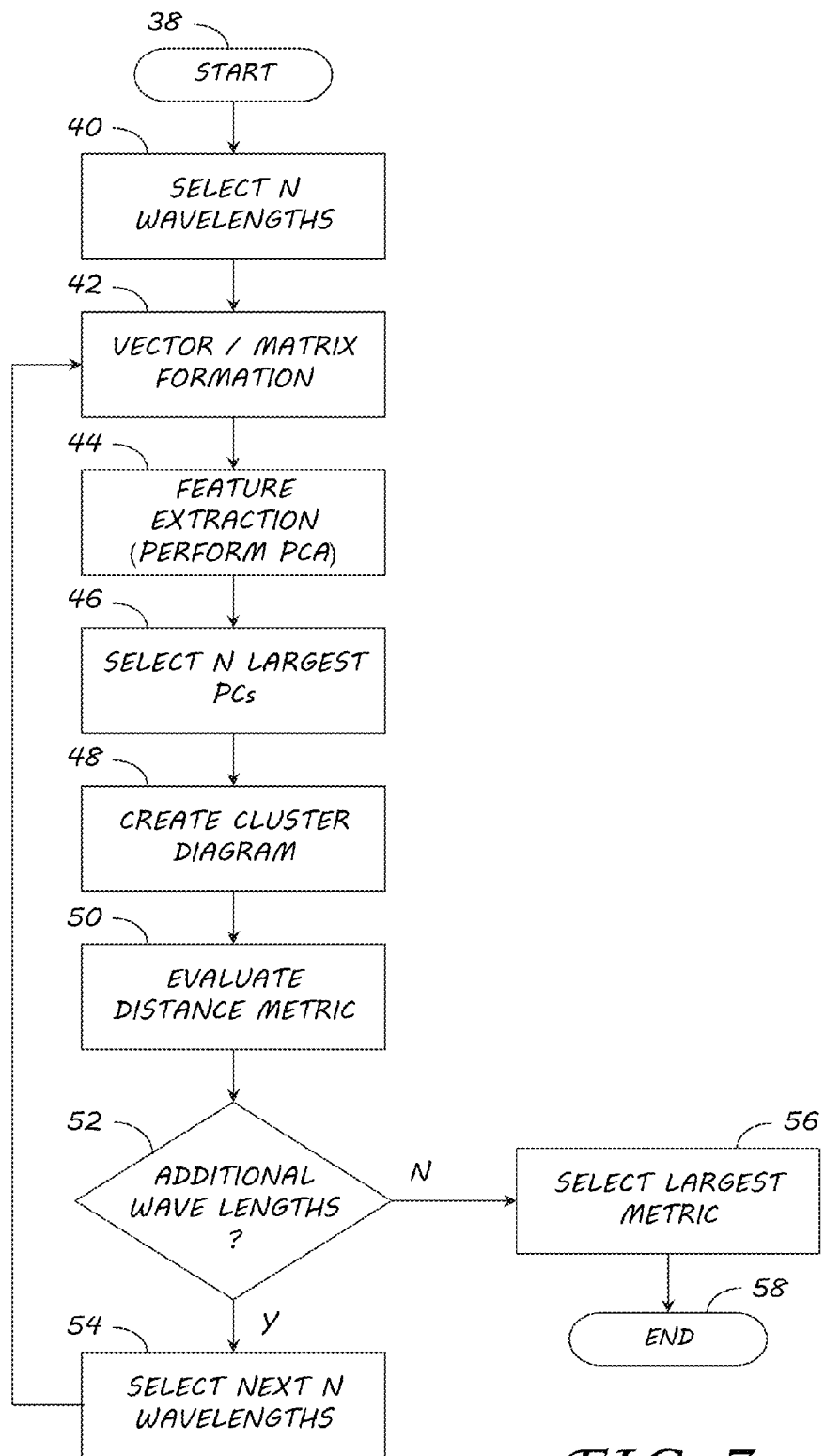
FIG. 7 is a flowchart of an iterative method for analyzing and simplifying spectral/temporal data, such as that in FIG. 3.

FIG. 7 illustrates an iterative method employed by embodiments of the invention for reducing spectral/temporal data. The process begins in block 38. Spectral/temporal data to be analyzed is collected and n wavelengths are selected in block 40. Then, in block 42, a matrix/vector notation of the selected data is formed. Feature extraction, in some embodiments implemented as PCA analysis, is performed on the data in block 44. From this analysis, n number of principle components are selected in block 46. Clusters may then be created in block 48 and evaluated for separation distance in block 50. If there are additional wavelengths in the spectral/temporal data ("Yes" branch of decision block 52), then the next n wavelengths are selected in block 54 and the process repeats beginning at block 42 with the newly selected n wavelengths. If there are no additional wavelengths in the spectral/temporal data ("No" branch of decision block 52), then the wavelengths having the largest distance metric is selected in block 56 and the process ends at block 58. In some embodiments, all combinations of n wavelengths in the spectral/temporal data may be evaluated by the process above before selecting a distance metric in block 56. Additionally, there may be no distance measurement to evaluate in block 50 if the selection of the data does not cluster in block 48.

Figure 8:
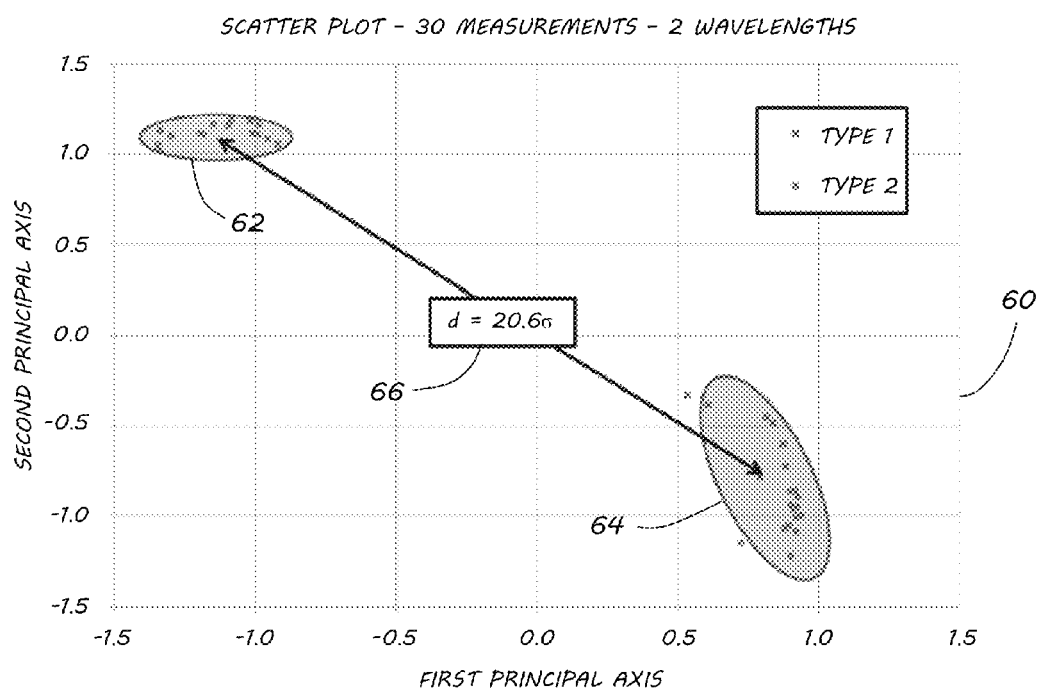
FIG. 8 is an exemplary scatter plot similar to FIG. 5 utilizing only two wavelengths.

When applied to the example above, using n=2 wavelengths, notice that the feature extraction PCA analysis is only a means to the end of finding the two wavelengths with the largest statistical separation distance metric. The measured high dimensional data is put into a matrix/vector notation with two of the total number of measured wavelengths included for the following PCA. The results of PCA yield the two orthogonal axes that have the largest amount of information in the original measured data. The sample pixels with known spectral content are then plotted on these axes creating a cluster diagram. The distance metric is evaluated and the next two wavelengths are processed in the same fashion until a combination of 100 wavelengths taken two at a time is exhausted. The pair of wavelengths having the largest metric is chosen as the set of two wavelengths and the solution is complete. FIG. 8 shows a scatter plot 60 with the result of picking the two wavelengths having the largest metric separation distance. When comparing clusters 62, 64 with clusters 26, 28, note that the distances 30 and 66 are different, which shows that there may be redundant wavelengths measured in the high dimensional case.

The method used for dimensionality reduction is based on information theoretic methods. This result of similar or better performance with only two wavelengths is an indication that many of the 100 wavelengths measured are redundant and not needed for identification of the species in the pixel. When a comparison is made between FIG. 5 and FIG. 8, it is necessary to recall that both of these diagrams are the result of a projection from a high dimensional space to a two dimensional space. The lengths are related only to projection of the information in that space to two dimensions.

In operation, embodiments of the invention may operate as an identification system using a minimal number of optical wavelengths. It can be thought of in a method similar to a fingerprint identification system. In order to identify the person belonging to a specific fingerprint, the image of an unknown fingerprint is matched against the images of all the fingerprints in a database. If the computer performing the matching operation needed to match every single pixel in each of two images containing 64,000 pixels (x=256, y=256), it would take a very long time. Hence, fingerprint matching usually only matches certain important relevant spatial features of the two images thereby dramatically reducing the time needed to make the match. In other words, the algorithm created for fingerprint matching has reduced the spatial dimension to optimize the speed of the search.

For embodiments of the invention, the information is the temporal variation of the spectral data collected by a sensor. In the example, a series of 30 daily satellite hypercube images of the same location on the face of the earth was used. The process described in conjunction with the embodiments of the invention reduced 224 independent spectral measurements down to two spectral measurements to find specific items on the surface of the earth. The effect of this dramatically reduces the cost of the sensor needed to be placed on the satellite. However, the downside is that only a certain subset of all items in the earth's surface can be identified by the satellite. Hence, cost and complexity have been traded for loss of specificity. The illustrated embodiment has, for example, reduced the required number of wavelengths to make an identification of a specific mineral or crop on the earth's surface and greatly reduced associated cost. Thus, the resulting reduction is highly dependent on the objective of the data collected by the sensor. One objective may include to first identify a specific material (like a crop seen from a satellite) with a minima number of wavelengths (in the illustrated example, two). A second objective may be to reduce the size, cost, and complexity of optical classification schemes, especially those used on expensive data collection systems such as satellites.

Figure 10A:
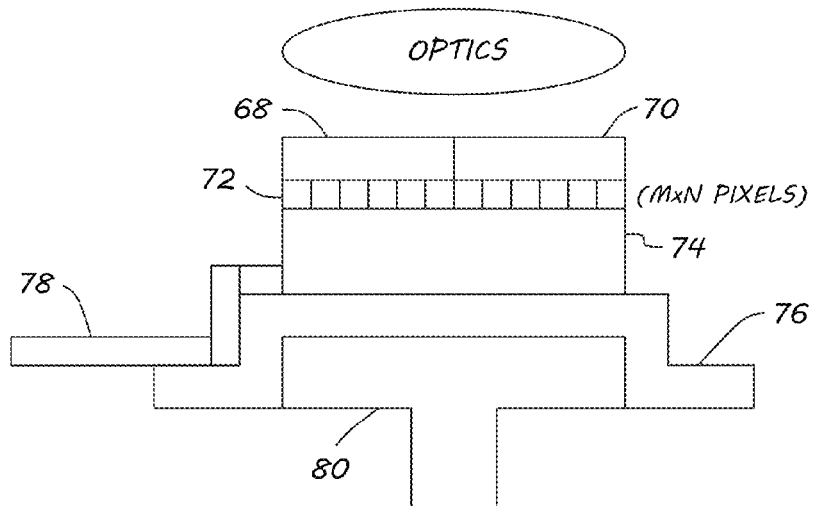
FIGS. 10A and 10B illustrate filters applied to the implementation in FIG. 9.
Figure 10B:
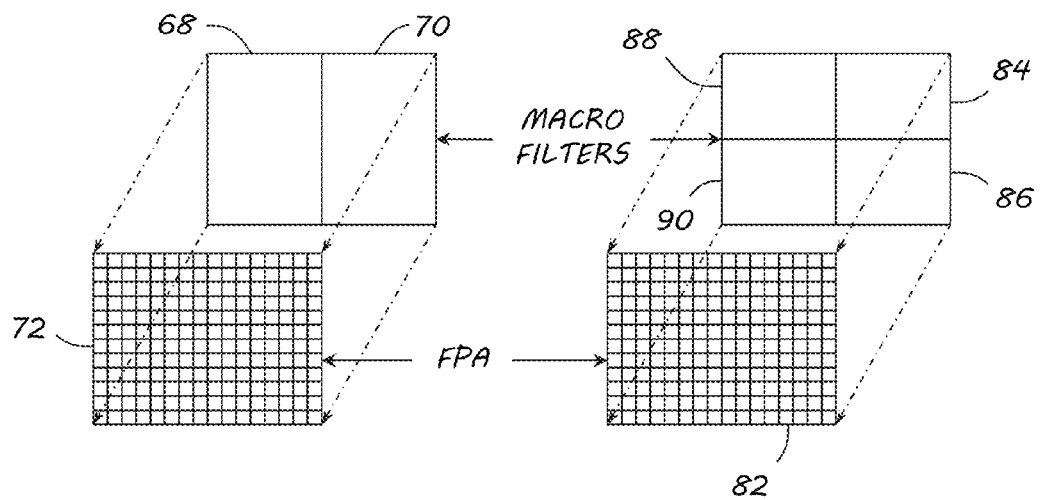

Results from embodiments of the invention may be implemented in a number of manners. A first exemplary implementation is shown FIG. 9. This figure illustrates a macro filter approach. Macro filters 68, 70 may be manufactured by processes known to the optical community. These can be large and then cut down to fit exactly over the photon sensitive pixels on a Focal Plane Array (FPA) 72. They are then cemented over the pixels allowing only the wavelengths found by the analysis performed by embodiments of the invention above to pass through to the optically sensitive pixels. The array size is defined by the sensing requirement and the ability of the manufacturer to fabricate them. A value of M×N is shown in FIG. 9 as an indication. A substrate material 74 is defined by the manufacturer of the FPA 72 and depends on the sensing requirement. The FPA 72 with substrate 74 is mounted on an integrated circuit chip carrier 76, which provides electrical connections 78 to the FPA 72. This is next affixed to a mounting pedestal 80. This provides a stable temperature to FPA 72 so that thermal variations do not affect the measurements. FIGS. 10A and 10B depict a method of attaching filters to the FPAs. In FIG. 10A, the FPA 72 is affixed with a two color macro filter 68, 70 for sensing the two selected wavelengths, whereas FPA 82 in FIG. 10B is affixed with a four color macro filter 84-90, which may sense more than two wavelengths.

Figure 11:
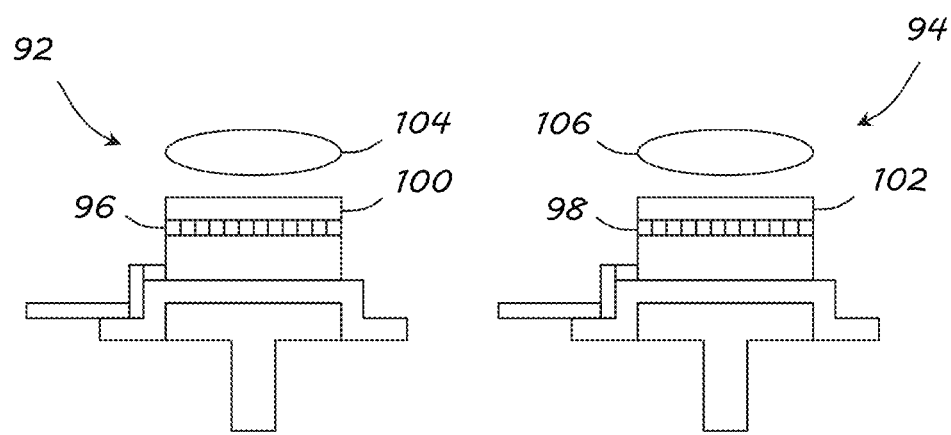
FIG. 11 is another exemplary implementation of the results of the algorithm in FIG. 8 plotted on the scatter plot in FIG. 8.
Figure 12:
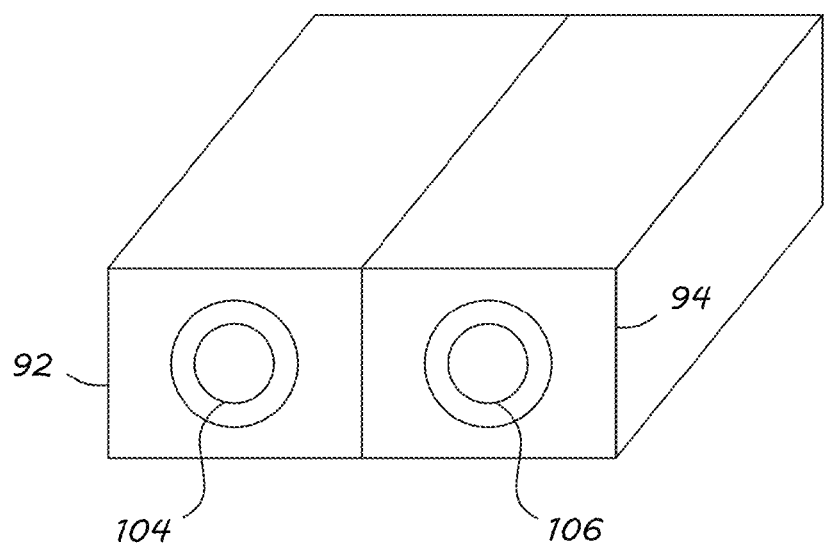
FIG. 12 is a camera configuration of the implementation of FIG. 11.

A second exemplary implementation illustrated in FIGS. 11 and 12 uses two commercial cameras 92, 94. In this implementation there are two separate Focal Plane Arrays 96, 98 and individual wave band filters 100, 102 are placed in the optical path to allow only the energy from the two optical bands that have been selected based on the methodology discussed above. In this method there are two complete packages created, each one having the components of FIG. 9. The difference in this implementation is that the filter optical pass bands are selected for each assembly based on the analysis above and requirements of the problem needing to be solved. Each of these FPA assemblies 96, 98 may then be placed inside its own camera housing 92, 94 as shown in FIG. 12. The cameras may then be securely attached to one another and made to point at the same point. In this configuration, both of the cameras look at the same spatial image but record the time varying signal for their selected waveband.

Figure 13:
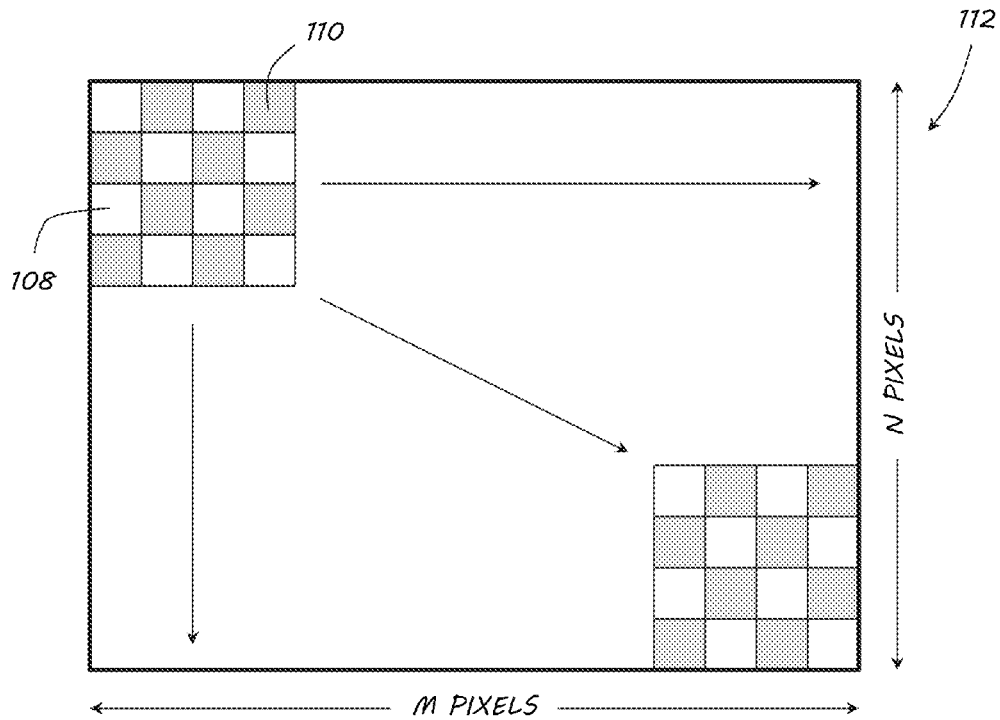
FIG. 13 is a third exemplary implementation of the results of the algorithm in FIG. 8 plotted on the scatter plot in FIG. 8.

In a third exemplary implementation, micro filters are used. The two previous implementations may experience difficulties with optical parallax for targets that are close to the sensor. Optical parallax is a displacement of the image on the FPA caused by two different lines of sight to the target. For distant objects parallax does not pose a significant problem. For example, with the second exemplary implementation in FIGS. 11 and 12, the two lenses 104, 106 and FPAs 96, 98 are separated by several cm and the image falling on the FPA will fall on different pixels. That is a target which is filtered by wavelength one in camera 92 will fall on a different pixel in camera 94. Image processing can help reduce or eliminate the problem, but an alternative solution is to incorporate micro filters. Micro filters are small individual filters 108, 110 placed on each pixel in a checkerboard fashion as shown in FIG. 13. The horizontal, vertical and diagonal arrows are included to show that the checkerboard pattern continues throughout the entire FPA 112. This embodiment is the most accurate in terms of parallax problems.

Figure 14:
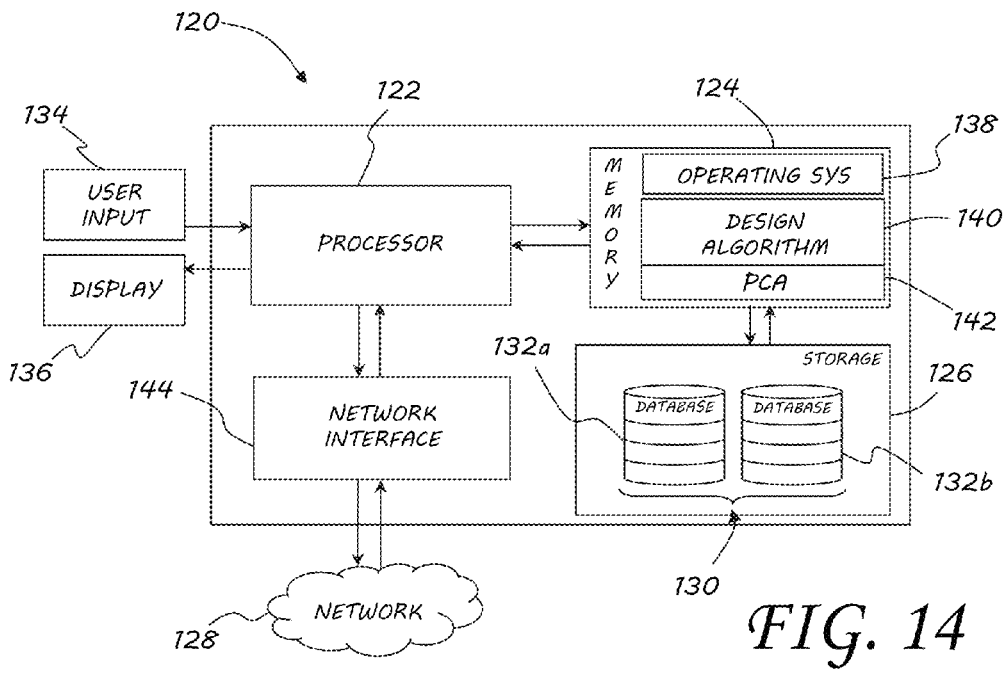
FIG. 14 is a diagrammatic illustration of an exemplary hardware and software environment for an apparatus configured to analyze and simplify spectral/temporal data consistent with embodiments of the invention.

FIG. 14 illustrates an exemplary hardware and software environment for an apparatus 120 suitable for analyzing spectral/temporal data in a manner consistent with the invention. For the purposes of the invention, apparatus 120 may represent practically any computer, computer system, or programmable device, e.g., multi-user or single-user computers, desktop computers, portable computers and devices, handheld devices, network devices, mobile phones, etc. Apparatus 120 will hereinafter be referred to as a "computer" although it should be appreciated that the term "apparatus" may also include other suitable programmable electronic devices.

Computer 120 typically includes at least one processor 122 coupled to a memory 124. Processor 122 may represent one or more processors (e.g. microprocessors), and memory 124 may represent the random access memory (RAM) devices comprising the main storage of computer 120, as well as any supplemental levels of memory, e.g., cache memories, non-volatile or backup memories (e.g. programmable or flash memories), read-only memories, etc. In addition, memory 124 may be considered to include memory storage physically located elsewhere in computer 120, e.g., any cache memory in a processor 122, as well as any storage capacity used as a virtual memory, e.g., as stored on a mass storage device 126 or another computer coupled to computer 120 via a network 128. The mass storage device 16 may contain a cache or other dataspace 130 which may include databases 132a and 132b, which may contain the spectral/temporal data.

Computer 120 also typically receives a number of inputs and outputs for communicating information externally. For interface with a user or operator, computer 120 typically includes one or more user input devices 134 (e.g., a keyboard, a mouse, a trackball, a joystick, a touchpad, a keypad, a stylus, and/or a microphone, among others). Computer 120 may also include a display 136 (e.g., a CRT monitor, an LCD display panel, and/or a speaker, among others). The interface to computer 120 may also be through an external terminal connected directly or remotely to computer 120, or through another computer communicating with computer 120 via a network 128, modem, or other type of communications device.

Computer 120 operates under the control of an operating system 138, and executes or otherwise relies upon various computer software applications, components, programs, objects, modules, data structures, etc. (e.g. design algorithm 140 and PCA 142). The design algorithm 140, for example, may optimize the wavelengths using PCA 142 on databases, such as the database 132a, 132b in the dataspace 130 containing the spectral/temporal data. Computer 120 communicates on the network 128 through a network interface 144.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 14 is not intended to limit the present invention. Indeed, those skilled in the art will recognize that other alternative hardware and/or software environments may be used without departing from the scope of the invention.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art, for example, other measured data with high dimensionality and variable acquisition time can use the method. The invention in its broader aspects is therefore not limited to the specific details, representative apparatus and method, and illustrative examples shown and described. Accordingly, departures may be made from such details without departing from the scope of the general inventive concept.

What is claimed is:

1. A method of simplifying spectral/temporal data, the method comprising:
    receiving spectral/temporal data;
    formulating the spectral/temporal data into a vector/matrix;
    performing a feature extraction analysis;
    determining at least two largest principal components from the feature extraction analysis;
    creating a cluster diagram from the at least two largest principal components;
    evaluating a distance metric from the cluster diagram; and
    selecting a largest metric based on the distance metric.

2. The method of claim 1, further comprising:
    repeating the formulating, performing, determining, creating, and evaluating steps for additional spectral/temporal data.

3. The method of claim 2, wherein the spectral/temporal data include a plurality of wavelengths, and wherein formulating spectral/temporal data into a vector/matrix comprises:
    selecting a first subset of the wavelengths in the plurality of wavelengths;
    formulating the selected first subset of wavelengths into a vector/matrix.

4. The method of claim 3, wherein repeating the formulating, performing, determining, creating, and evaluating steps comprises:
    selecting a second subset of the wavelengths in the plurality of wavelengths;
    repeating the formulating, performing, determining, creating, and evaluating steps for the selected second subset of wavelengths.

5. The method of claim 4, wherein the first and second subsets of wavelengths each include 2 wavelengths.

6. The method of claim 1, wherein the feature extraction analysis may be selected from a group consisting of independent component analysis, nonlinear prime component analysis, support vector decomposition analysis, principal component analysis, and combinations thereof.

7. The method of claim 1, wherein the distance metric is a statistical metric.

8. The method of claim 7, wherein the statistical metric is a standard deviation.

9. The method of claim 1, wherein the spectral/temporal data is electro-optical imaging data.

10. An apparatus comprising:
    a memory;
    a processor; and
    a program code resident in the memory and configured to be executed by the processor for simplifying electro-optical imaging data, the program code further configured to receive spectral/temporal data, formulate the spectral/temporal data into a vector/matrix, perform a feature extraction analysis, determine at least two largest principal components from the feature extraction analysis, create a cluster diagram from the at least two largest principal components, evaluate a distance metric from the cluster diagram, and select a largest metric based on the distance metric.

11. The apparatus of claim 10, wherein the program code is further configured to:
    repeat the formulating, performing, determining, creating, and evaluating steps for additional spectral/temporal data.

12. The apparatus of claim 11, wherein the spectral/temporal data include a plurality of wavelengths, and wherein the program code is further configured to formulate spectral/temporal data into a vector/matrix by:
    selecting a first subset of the wavelengths in the plurality of wavelengths;
    formulating the selected first subset of wavelengths into a vector/matrix.

13. The apparatus of claim 12, wherein the program code is further configured to repeat the formulating, performing, determining, creating, and evaluating steps by:
    selecting a second subset of the wavelengths in the plurality of wavelengths;
    repeating the formulating, performing, determining, creating, and evaluating steps for the selected second subset of wavelengths.

14. The apparatus of claim 13, wherein the first and second subsets of wavelengths each include 2 wavelengths.

15. The apparatus of claim 10, wherein the feature extraction analysis of the program code may be selected from a group consisting of independent component analysis, nonlinear prime component analysis, support vector decomposition analysis, principal component analysis, and combinations thereof.

16. A non-transitory computer recordable type medium storing a program code configured to simplify electro-optical imaging data and further configured, when executed on a hardware implemented processor, to receive spectral/temporal data, formulate the spectral/temporal data into a vector/matrix, perform a feature extraction analysis, determine at least two largest principal components from the feature extraction analysis, create a cluster diagram from the at least two largest principal components, evaluate a distance metric from the cluster diagram, and select a largest metric based on the distance metric.

17. The program code of claim 16, wherein the program code is further configured to:
    repeat the formulating, performing, determining, creating, and evaluating steps for additional spectral/temporal data.

18. The program code of claim 17, wherein the spectral/temporal data include a plurality of wavelengths, and wherein the program code is further configured to formulate spectral/temporal data into a vector/matrix by:
    selecting a first subset of the wavelengths in the plurality of wavelengths;
    formulating the selected first subset of wavelengths into a vector/matrix.

19. The program code of claim 18, wherein the program code is further configured to repeat the formulating, performing, determining, creating, and evaluating steps by:
    selecting a second subset of the wavelengths in the plurality of wavelengths;

repeating the formulating, performing, determining, creating, and evaluating steps for the selected second subset of wavelengths.

20. The program code of claim 16, wherein the feature extraction analysis of the program code may be selected from a group consisting of independent component analysis, nonlinear prime component analysis, support vector decomposition analysis, principal component analysis, and combinations thereof.

\* \* \* \* \*